Figure 5:
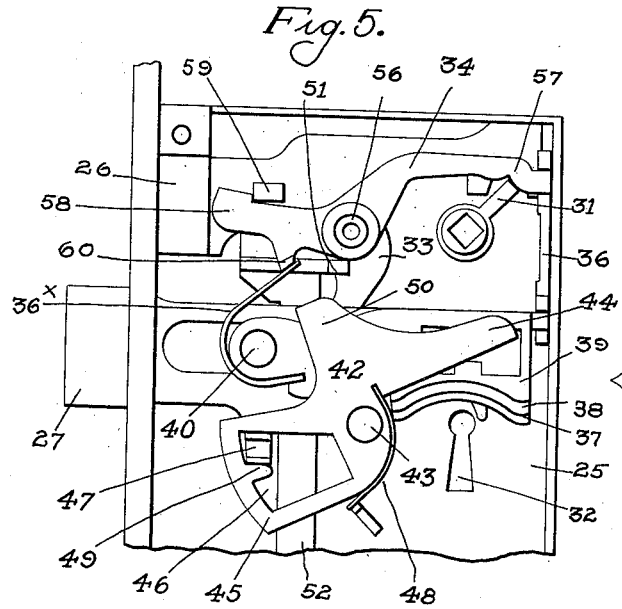

A. A. PAGE & H. H. MUNSON.
LOCK.
APPLICATION FILED JAN. 8, 1913.
1,095,124. Patented Apr. 28, 1914.
4 SHEETS—SHEET 1.
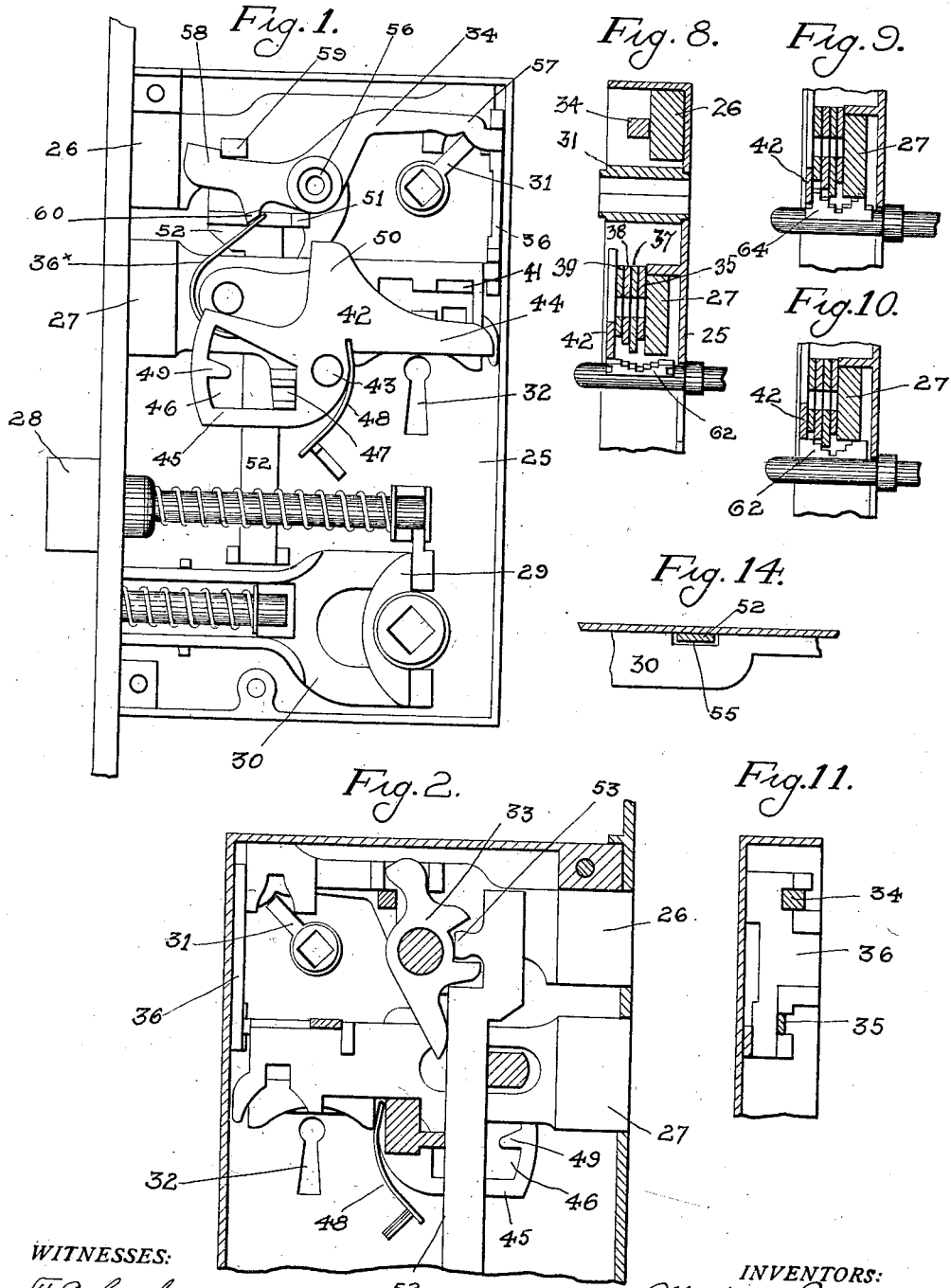

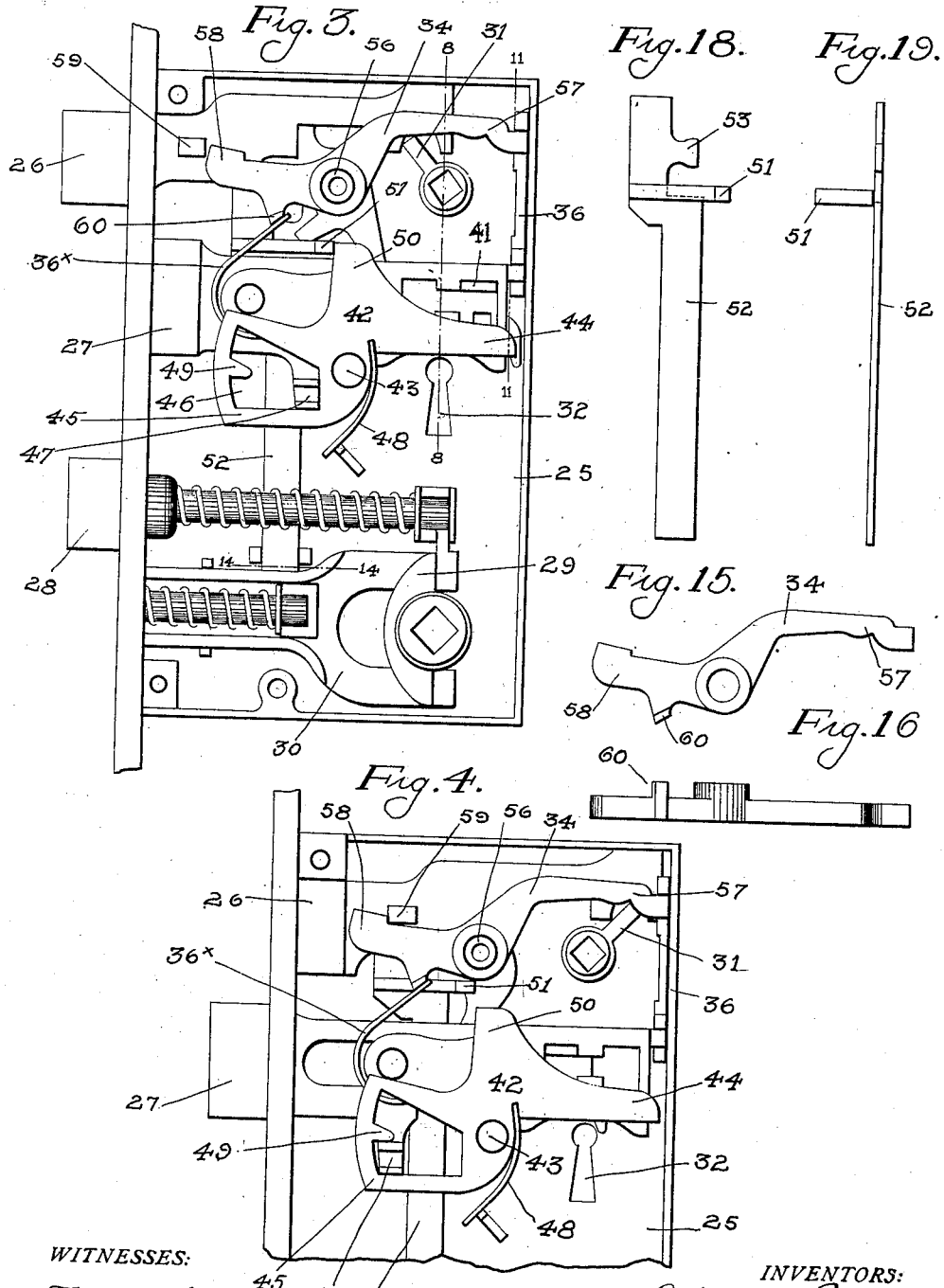

A. A. PAGE & H. H. MUNSON.
LOCK.
APPLICATION FILED JAN. 8, 1913.

1,095,124.

Patented Apr. 28, 1914.
4 SHEETS—SHEET 3.

WITNESSES:
F. A. Carlson
H. E. Cooper

INVENTORS:
Albert A. Page
Henry H. Munson
BY
Beach & Fisher
ATTORNEYS.

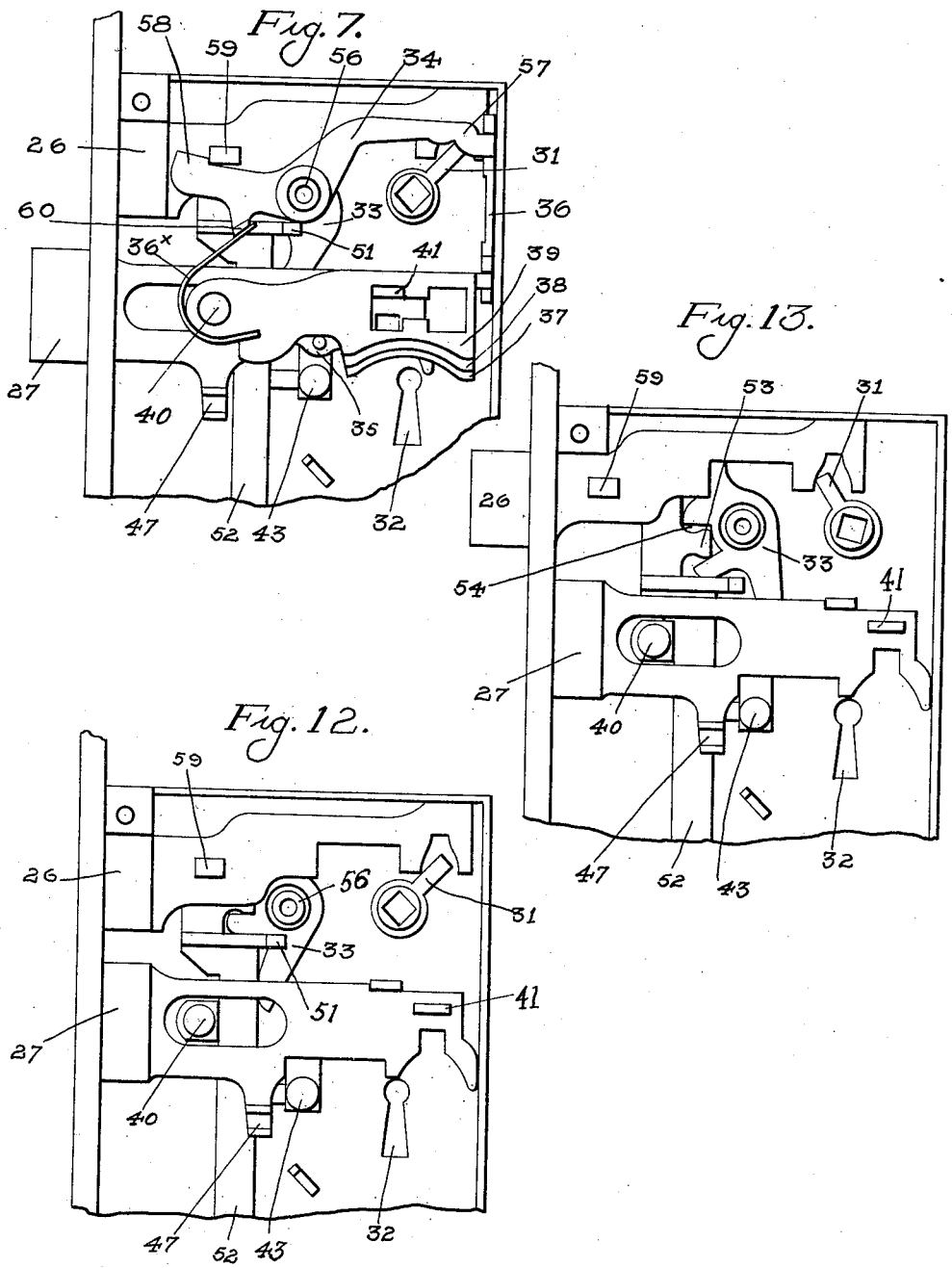

UNITED STATES PATENT OFFICE.

ALBERT A. PAGE, OF EAST HAVEN, AND HENRY H. MUNSON, OF NEW HAVEN, CONNECTICUT, ASSIGNORS TO SARGENT & COMPANY, OF NEW HAVEN, CONNECTICUT, A CORPORATION OF CONNECTICUT.

LOCK.

1,095,124.    Specification of Letters Patent.    Patented Apr. 28, 1914.

Application filed January 8, 1913.  Serial No. 740,828.

*To all whom it may concern:*

Be it known that we, ALBERT A. PAGE and HENRY H. MUNSON, of the town of East Haven and city of New Haven, respectively, county of New Haven, and State of Connecticut, have invented certain new and useful Improvements in Locks, of which the following is a full, clear, and exact description.

This invention relates to locks, and more particularly to hotel locks having outside and inside dead bolts so arranged and connected that the protraction of one, when the other is protracted, will result in the retraction of the second bolt, after which the first bolt may be retracted independently. Locks of this type have in some instances been provided with a movable ward or blocking member coöperating with the keyhole of the outside bolt and having a single blocking position in which it is held by the protraction of either bolt. When a display key has been used for preventing the withdrawal of the outside bolt by a guest key or master key when said bolt has been thrown by the display key, the blocking position assumed by the movable ward or blocking member is the same as that which it assumes when the inside bolt is thrown or when the outside bolt is thrown by the emergency key. This complicates considerably the bitting of the keys of the series (guest, master, grand-master, display and emergency) in order to distinguish them from each other to a sufficient extent.

The primary object of our present invention is to provide a hotel lock of the general type above indicated wherein the ward or blocking member associated with the keyhole of the outside bolt is not only locked in blocking position by the protraction of the inside bolt but is locked in either of three different positions as the outside bolt is thrown by three different keys. For example, when the outside bolt is thrown by the emergency key the ward will be locked in a position to block all of the other keys; when said bolt is thrown by the display key the ward is locked in another different position wherein it blocks the operation of the guest key, master and grand-master keys; and when the outside bolt is thrown by either of the guest, master or grand-master keys, it will be locked in an inoperative position wherein it permits the retraction of the bolt by any key of the series. The movable ward or blocking member has a definite blocking position in which it is held as the inside bolt is thrown by a thumb-turn or key, and as the outside bolt is thrown by the emergency key; and it also has two other positions, to wit, a blocking position in which it is locked by the protraction of the outside bolt by the display key, and an inoperative position in which it is locked by the protraction of the outside bolt by one or more keys of a lower order.

Other objects of our invention are to provide a lock having the above characteristics which is easily reversible, to improve the specific form and arrangement of the movable ward; to provide a lock of the kind described in which the movable ward has no direct coöperation with the stump of the outside bolt, so that the tumbler mechanism of the outside bolt will not be unnecessarily complicated; to furnish a lock in which a single member actuated by the protraction of the inside bolt locks a movable ward or blocking member associated with the outside bolt, and dogs a knob or other manipulating member for retracting the latch bolt with which the lock is provided; and to improve certain general features and details of the lock construction, as hereinafter described.

To these and other ends, the invention consists in the novel features and combinations of parts to be hereinafter described and claimed.

Figures 20, 21:
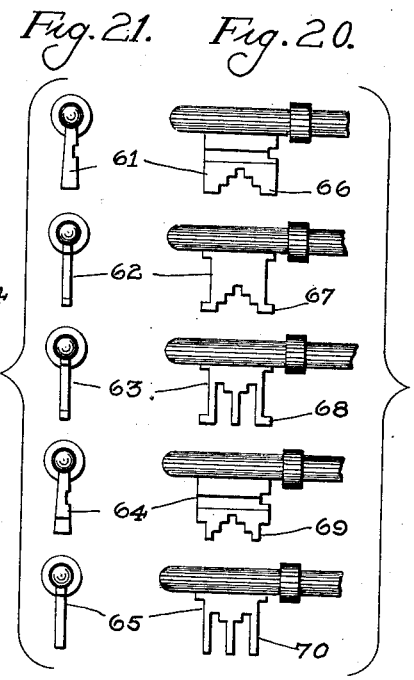
Figure 6:
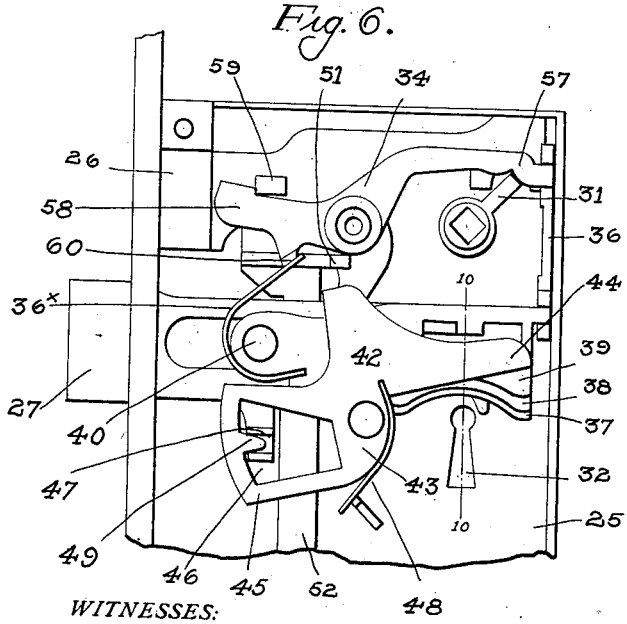
Figure 17:
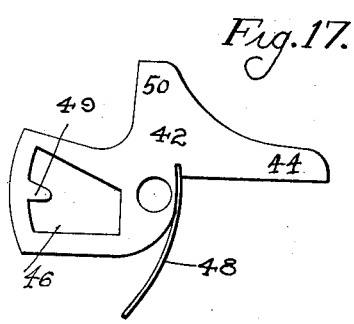

In the accompanying drawings, Figure 1 is an elevation of a lock embodying our improvements, with the cap removed, and both dead bolts retracted, Fig. 2 is a reverse view of a portion of Fig. 1 with the back or bottom of the case cut away, Fig. 3 is a view similar to Fig. 1 but showing the inside bolt protracted, Fig. 4 shows the upper portion of the lock as the parts appear when the inside bolt is in retracted position and the outside bolt has been protracted by the emergency key, Fig. 5 is a view similar to Fig. 4 but showing the position of the movable ward when the outside bolt is protracted by the guest, master or grand-master key, Fig. 6 is a view similar to Fig. 5 but showing the position of the ward when the outside bolt is protracted by the display key, Fig. 7 is a view similar to Figs. 4, 5 and 6 with the omission of the movable ward, Fig. 8 is a section on line 8—8 of Fig. 3, showing the blocking of the guest key in the outside keyhole when the inside bolt is thrown, Fig. 9 is a generally similar view showing the blocking of the display key under the same conditions, Fig. 10 is a section on line 10—10 of Fig. 6, showing the blocking of the guest key by the movable ward when the outside bolt has been thrown by the display key, Fig. 11 is a section on line 11—11 of Fig. 3, Fig. 12 is a view of the upper portion of Fig. 1 with the movable ward and the tumblers of both dead bolts omitted, Fig. 13 is a view similar to Fig. 12, the inside bolt being protracted, Fig. 14 is a section on line 14—14 of Fig. 3, Figs. 15 and 16 are details of the tumbler of the inside bolt, Fig. 17 is a detail of the movable ward or blocking member, Figs. 18 and 19 are details of the slide which blocks the ward and dogs the knob shoe, Fig. 20 shows in side elevation the bits of the several keys, and Fig. 21 shows the several keys in end elevation.

Referring to the drawings, 25 indicates the case of the lock and 26 and 27 the inside and outside dead bolts respectively. The case also contains the usual latch bolt 28 actuated by a hub 29 coöperating with the customary yoke or knob shoe 30. In the form shown, the inside dead bolt 26 is arranged above the outside dead bolt 27 and the latch bolt 28 is beneath both dead bolts, but these features are not essential in the broader aspects of the invention. Moreover, we have shown the inside bolt adapted for actuation by a thumb-turn hub 31 but it may be actuated just as well by means of a key inserted from the inside of the room. The outside bolt 27 is actuated by means of a key inserted in a keyhole 32. The bolts 26 and 27 are interconnected in the well known manner by a lever 33, pivoted on a post 56, to the end that the protraction of either bolt when the other bolt is protracted will result in the retraction of the second bolt, after which the first bolt can be retracted independently. In order to accomplish this result the tumbler 34 of the inside bolt is connected with the tumbler mechanism of the outside bolt so that the tumblers of both bolts will be actuated together. In the embodiment illustrated, the tumbler 34 is connected with the carrier or master key tumbler 35 of the outside bolt by means of a connecting slide 36. Coöperating with the carrier tumbler 35 are ordinary tumblers 37, 38 and 39 and all four tumblers are pivoted in the case on a post 40 and coöperate in the usual way with the stump 41 of the outside bolt. The mechanism thus far described is of usual construction, and forms in itself, no part of our present invention.

In carrying out the invention, we provide a movable ward or blocking member 42 adapted to block the operation of the outside bolt by certain keys of a series, as hereinafter described. The blocking member 42 is in the form of a plate or lever mounted independently of the tumblers 35 37, 38, 39. The member 42 is pivoted in the case on a post 43 located intermediate of the ends of the blocking member. The rearwardly projecting portion 44 of the member 42 projects into close proximity to the keyhole 32 and the forwardly extending portion 45 of the member 42 is provided with a gating 46 in which a lug 47 projecting from the bolt 27 is slidable as the bolt is protracted and retracted. A spring 48 acting on the member 42 normally holds it in the position shown in Fig. 1 where the sweep of the rearward extension 44 will be engaged by the bit of a key rotated in the keyhole 32. The lug 47 is of forked or bifurcated form and is intended to coöperate with a lug 49 projecting into the gating 46. As the bolt 27 is thrown by different keys, as presently explained, the lug 47 will be engaged with the blocking member 42 in three different positions. In one position the lug 47 will lie immediately beneath the lug 49; in another position the lug 49 will be engaged in the fork or notch of the lug 47; and in the third position the lug 47 will lie above the lug 49.

The blocking member 42 is provided at its intermediate portion with an upward extension 50 adapted to coöperate with a lug or abutment 51 on a slide 52 actuated automatically by the protraction of the inside bolt 26. In the form shown, the slide 52 consists of an elongated plate guided vertically in a suitable manner on the back or bottom of the case, beneath the dead bolts. This slide moves at right angles to the paths of movement of said bolts and is actuated by means of a lug 53 extending from the upper portion thereof into engagement with a notch 54 in the connecting lever 33. The arrangement is such that as the inside bolt is thrown the slide 52 will be moved downward, whereby the lug or abutment 51 will be shifted into a position in front of the extension 50 of the ward 42, which prevents the ward from being rocked on its pivot. On the other hand, when the inside bolt is retracted the slide 52 is raised to release the movable ward. The lower end of the slide 52 is adapted to engage a notch 55 in the knob shoe or yoke 30 when the slide is in its lowermost position, so that when the inside bolt has been thrown by the occupant of the room the fixing of the knob against rotation at the outside of the door will give notice to chambermaids and other persons that the room is occupied.

The tumbler 34 of the inside bolt 26 is pivoted intermediate of its ends on the post 56. The rear extremity 57 of said tumbler coöperates with the thumb-turn hub 31 previously described and the forwardly extending portion 58 of the tumbler coöperates with a stump 59 on the bolt 26. The tumbler 34 is provided at one side of the pivot with a projection 60 which serves as an abutment for the springs 36× of the tumblers 37, 38, 39 of the outside bolt, the tumbler 35 being unprovided with a spring. By having the lug 60 engage the springs of the several tumblers 37, 38, 39, the necessary spring action is imparted to the tumbler 34 of the inside bolt as well as to the aforesaid tumblers of the outside bolt.

Figs. 20 and 21 show the bits of the several keys which actuate this lock. 61 is the guest key bit, 62 the master key bit, 63 the bit of the grand-master key, 64 the bit of the display key and 65 the bit of the emergency key. The bits 61, 62 and 63 are provided with full ends or corners 66, 67 and 68 respectively to engage and raise the movable ward 42 at the same time that the ordinary tumblers of the outside bolt are actuated in the usual manner. The display key bit 64, on the other hand, is slightly cut away at the corners, as shown at 69, in order to raise the movable ward 42 to a less extent, and the bit 65 of the emergency key is completely cut away at the ends, as shown at 70, in order to clear the ward entirely. The other distinctions between the various keys will be apparent to those skilled in the art and they need not be mentioned in further detail.

The operation of our improved lock is substantially as follows: When the bolt 26 is thrown from the inside of the room by the operation of the thumb-turn member 31, the slide 52 will be moved downward by the rocking of the connecting lever 33 on its pivot. This will carry the lower end of the slide into engagement with the knob shoe 30, and the knob will be dogged for the purpose hereinbefore described. The lug 51 on the slide 52 will also be carried downward to block the swinging movement of the movable ward 42. When the lug 51 is moved in front of the extension 50 of the movable ward it will obviously be impossible to move the extension 44 upward away from the keyhole 32. As none of the keys, with the exception of the emergency key, is bitted to clear the ward when it is locked in this blocking position, the emergency key will be the only one which will open the lock from the outside and accordingly, under the conditions noted, access to the room will be confined to the proprietor of the hotel.

Fig. 8 shows how the master key, for example, is blocked in an attempt to throw the outside bolt and thereby open the lock. Fig. 9 shows how the display key is blocked under similar circumstances. If the proprietor wishes to get into the room he inserts the emergency key in the outside keyhole, and on rotating the key the same will clear the ward 42 and throw the outside bolt 47 thereby retracting the inside bolt 26 through connection with the lever 33, after which the bolt 27 may be retracted independently.

When a guest key, master key or grand-master key is inserted into the outside keyhole 32 to protract the outside bolt, one of the full corners (66, 67 or 68) of said key will strike the extension 44 of the ward 42 and move said extension upwardly away from the keyhole, whereby the opposite end of the ward having the gating 46, will be depressed, and as the bolt is fully protracted the lug 47 of the same will take over the lug 49 of the ward and thereby lock the latter in the inoperative position shown in Fig. 5. In this position, the ward 42 will not interfere with the retraction of the outside bolt by any of the keys. When the display key, having the bit 64, is inserted into the outside keyhole 32, with the parts in the position of Fig. 1, one of the notched corners 69 of the bit will raise the extension 44 to a slight extent only when the bit is rotated, and as the bolt 47 is moved to fully protracted position the fork or notch of the bolt lug 47 will engage the lug 49 of the ward, and thereby lock the ward in the position shown in Fig. 6. Under these circumstances, the bolt 27 may be retracted by the display key, which will clear the extension 42 when the display key is rotated in a direction to retract the bolt. As the bolt moves inward, the lug 47 will move out of engagement with the lug 49 and the spring 48 of the ward 42 will turn the latter to its normal position. However, with the parts in the position shown in Fig. 6, it will be impossible for the guest key, master key, or grand-master key to retract the outside bolt, inasmuch as the corners of the bits of said keys are not cut away to clear the extension 44 when it is in the position indicated. Fig. 10 shows how the guest key is blocked when this operation is attempted. Outside of the display key, the emergency key is the only one which will clear the ward 42 and retract the outside bolt when the bolt has been thrown by the display key.

When the outside bolt 27 is thrown by the emergency key, the latter will clear the movable ward entirely and hence there will be no swinging movement of the ward on its pivot 43. As the bolt is moved to fully protracted position the lug 47 thereof will take under the lug 49 of the ward and thereby lock the ward in a position wherein its extension 44 will block the rotation in the keyhole 32, of any key of the series excepting the emergency key itself. The action of the ward in this respect is exactly the same as when it is locked in blocking position by the protraction of the inside bolt. Hence it will be understood that the display key will lock the door against the keys of lower order, and that the emergency key in turn will lock the door against opening by any of the other keys, and will open the door when locked by any of the other keys.

The lock is readily reversible simply by reversing the latch bolt 28. A keyhole 32 for the outside bolt is formed in the cap plate as well as in the back or bottom of the case, and the hub of the thumb-turn member 31 projects through the cap plate as well as through the back of the case. As previously intimated, we may omit the thumb-turn member 31 and actuate the inside bolt by a key adapted to enter the case through keyholes at opposite sides.

Of course, we have not attempted to illustrate and describe the numerous modifications of the lock which may be adopted within the scope of our invention as expressed in the claims.

What we claim is:

1. In a lock, a case having a keyhole, a plurality of dead bolts in said case, one of which is normally operable by any of a number of keys inserted in said keyhole, a series of keys to actuate said bolt including a display key and an emergency key, a movable ward associated with said keyhole and means for locking said ward in one blocking position by the protraction of said key bolt by the emergency key or by the protraction of the other bolt, and in another blocking position by the protraction of said key bolt by the display key; substantially as described.

2. In a lock, a case having a keyhole, a plurality of bolts in said case, one of which is operable by way of said keyhole, at least three different keys to actuate said bolt, a movable ward associated with said keyhole, and means to lock said ward in either of three different positions on the protraction of said key bolt by the respective keys, and in one of said positions when the other bolt is protracted; substantially as described.

3. In a lock, a case having a keyhole, a plurality of bolts in said case, one of which is operable by way of said keyhole, a plurality of keys to operate said key bolt, a movable ward associated with said keyhole, and means for locking said ward in one blocking position by the protraction of the other bolt and in another blocking position on the protraction by one of said keys of the bolt to which it relates; substantially as described.

4. A reversible lock having a case, a plurality of bolts therein, at least one of which is a key bolt, a movable blocking member associated with said key bolt, and means for automatically locking said ward in one blocking position by the protraction of the other bolt or by the protraction by a certain key of the bolt to which it relates, and in either of two additional positions as said last named bolt is thrown by two other keys respectively; substantially as described.

5. In a lock, the combination of a case having a keyhole, a bolt in said case operable by a key inserted in said keyhole, a ward associated with said keyhole, having means for locking it in key blocking position as said bolt is protracted by a certain key, a second bolt, and means separate from but operable by said second bolt as the latter is protracted to lock said ward in key blocking position; substantially as described.

6. In a lock, a case having a keyhole, a bolt in said case operable by way of said keyhole, a tumbler for said bolt, a stump on the bolt coöperating with said tumbler, a movable ward associated with said keyhole, and a lug on said bolt to lock said ward against movement; substantially as described.

7. In a lock, a key bolt, a stump thereon, a tumbler coöperating with said stump, a movable key blocking device, and means independent of said tumbler stump, and including a member on the bolt, to lock said key blocking device in any of three different positions; substantially as described.

8. In a lock, the combination of a case having a keyhole, a bolt in said case operable by a key inserted in said keyhole, a ward associated with said keyhole, and having means to lock it in key blocking position as said bolt is protracted by a certain key, a second bolt, and means movable substantially at right angles to said second bolt, as the latter is protracted, to engage said ward and lock it in key blocking position; substantially as described.

9. In a lock, a key bolt having a stump, a tumbler coöperating with said stump, a pivot for said tumbler, and a movable key blocking device mounted remotely from the tumbler pivot and having means to lock it to the bolt at a point remote from said tumbler stump; substantially as described.

10. In a lock, the combination of two bolts, a movable ward associated with one bolt, means connecting said bolts so that they move in opposite directions, and means operated by said last means to block said ward against movement; substantially as described.

11. In a lock, the combination of two bolts, a lever connecting said bolts, a movable key blocking device associated with one of said bolts, and means actuated by said lever to lock said key blocking device against movement; substantially as described.

12. In a lock, the combination of two bolts, a lever connecting said bolts, a movable ward associated with one of said bolts, and a slide operated by said lever and engageable with said ward to lock the same against movement; substantially as described.

13. In a lock, the combination of two bolts, a lever connecting said bolts, a pivoted ward associated with one of said bolts and having an extension thereon, and a slide actuated by said connecting lever and having a lug to engage said extension and thereby block the pivotal movement of said ward; substantially as described.

14. In a lock, the combination of a dead bolt, a latch bolt, a latch bolt manipulating member, a key blocking device associated with said dead bolt, and a single member to dog said manipulating member and to lock said key blocking device against movement; substantially as described.

15. In a lock, the combination of two dead bolts, a latch bolt, a latch bolt manipulating member, a key blocking device associated with one of said dead bolts, and a single means actuated by the protraction of one of said dead bolts to lock said key blocking device and said latch bolt manipulating member against movement; substantially as described.

16. In a lock, the combination of inside and outside dead bolts, a latch bolt, a latch bolt manipulating member, a movable key blocking device associated with the outside dead bolt, and a single means actuated by the protraction of the inside dead bolt to block the movement of said key blocking device and said latch bolt manipulating member; substantially as described.

17. In a lock, the combination of inside and outside dead bolts, a latch bolt, a latch bolt manipulating member, a movable key blocking device associated with the outside dead bolt, and a single sliding member actuated by the protraction of the inside dead bolt to block the movement of said key blocking device and said latch bolt manipulating member; substantially as described.

18. In a lock, the combination of two dead bolts, tumblers for the respective bolts, and a single spring acting directly on both of said tumblers; substantially as described.

19. In a lock, the combination of two dead bolts, a tumbler for one of said bolts, a spring carried by said tumbler, and a tumbler for the other bolt serving as an abutment for said spring; substantially as described.

20. In a lock, the combination of two dead bolts, pivoted tumblers for the respective bolts, and a single spring acting on both tumblers by direct engagement therewith; substantially as described.

21. In a lock, the combination of two bolts, a tumbler for one of said bolts, a tumbler for the other bolt pivoted intermediate of its ends, and a spring carried by the first tumbler and acting on the second tumbler; substantially as described.

22. In a lock, the combination of two bolts, a lever connecting said bolts, a pivot for said lever, and a tumbler for one of said bolts pivoted intermediate of its ends on said pivot; substantially as described.

23. In a lock, the combination of two bolts, a lever connecting said bolts, a pivot for said lever, a tumbler for one of said bolts pivoted intermediate of its ends on said pivot, and a stump on said bolt coöperating with that portion of the tumbler which lies in front of the pivot: substantially as described.

24. In a lock, a case having a keyhole, a bolt in said case operable by a key inserted in said keyhole, a key blocking member in said case associated with said keyhole, a second bolt, a lever connecting said bolts to move in opposite directions, and means operated by said lever to lock said key blocking device against movement as said second bolt is protracted; substantially as described.

In witness whereof, we have hereunto set our hands on the 6th day of January 1913.

ALBERT A. PAGE.
HENRY H. MUNSON.

Witnesses:
 E. M. HORAN,
 FRANCES HOWARD.

---

Copies of this patent may be obtained for five cents each, by addressing the "Commissioner of Patents, Washington, D. C."